(No Model.)
O. C. HALL.
MACHINE FOR MAKING CONTINUOUS COLLARED AXLE BLANKS AND AXLES.
No. 469,784. Patented Mar. 1, 1892.
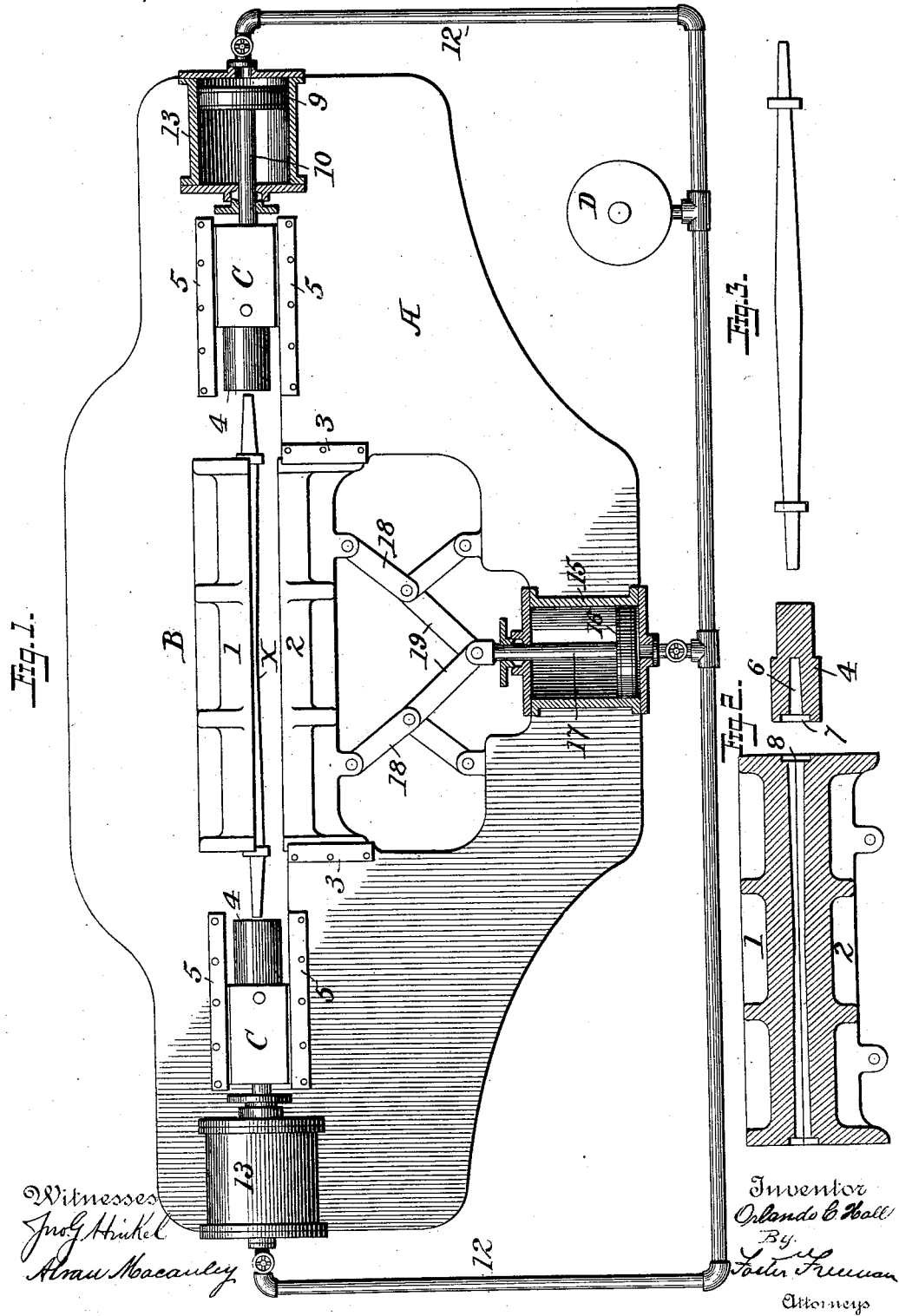

UNITED STATES PATENT OFFICE.

ORLANDO CLIFFORD HALL, OF AUBURN, NEW YORK, ASSIGNOR TO CHARLES L. SHELDON, OF SAME PLACE.

MACHINE FOR MAKING CONTINUOUS COLLARED AXLE-BLANKS AND AXLES.

SPECIFICATION forming part of Letters Patent No. 469,784, dated March 1, 1892.

Application filed January 9, 1892. Serial No. 417,516. (No model.)

*To all whom it may concern:*

Be it known that I, ORLANDO CLIFFORD HALL, a citizen of the United States, residing at Auburn, in the county of Cayuga and State of New York, have invented certain new and useful Improvements in Machines for Making Continuous Collared Axle-Blanks and Axles, of which the following is a specification.

In the manufacture of that class of axle bars and blanks in which the collars at the inner ends of the journals are formed in one piece with the bar it is customary to form such collars by upsetting the metal—that is, by heating the metal at the point where the collar is to be formed, then clamping the bar and bringing an upsetting-die to act upon the end to force the latter toward the clamps, thereby pressing out a section of the metal, forming an enlargement to which the proper shape is imparted by recesses in the contiguous faces of the clamps and upsetting-dies. It is also common to form the journal at the same time by so shaping the socket in the upsetting-die as to impart the proper taper to the end of the bar. The objections to this method of manufacture are those incident to heating the metal and consequent liability of deteriorating the strength and the loss of time in operating separately upon the opposite ends of the bars and the necessity of employing a very powerful clamp to hold the bar against the powerful pressure of the upsetting-die. To overcome these objections I act upon both ends of the bar simultaneously, so as to upset it at two points and form both collars at the same time, also tapering the ends to form the journals at the same time, if desired, and in order to overcome the objections incident to heating the bar I apply such powerful pressure as to upset the metal cold and without heating, the simultaneous longitudinal pressure at both ends throwing all the strain upon the dies, so that it is not necessary to depend upon the clamp to resist the thrust of the die.

In carrying out this method of manufacture I may make use of mechanism of different constructions, but will now describe that which is most effective, referring to the accompanying drawings, in which—

Figure 1 is a plan of a clamping and upsetting machine in which hydraulic pressure is employed. Fig. 2 is a section through the clamp and dies. Fig. 3 is a view illustrating the axle bar or blank as formed by my improved process.

The bed A of the machine is of any suitable construction and supports a clamp B, two upsetting-dies C C, and the mechanism for opening and closing the clamp and for moving the upsetting-dies under the powerful pressure required.

There may be one or more clamps B of suitable construction. As shown, the clamp B consists of two jaws 1 2, one of which may be stationary, although both may be removable. In the construction shown the jaw 1 is stationary, the jaw 2 moves between guides 3 3, and in said jaws are channels or recesses conforming to the shape of the axle-blank X.

Each of the upsetting-dies C C consists of a sliding block 4, movable longitudinally in a guide 5, clamped to the base, said block having a tapering socket 6 and a circular recess 7, and in each end of each section of the clamp B is a recess, the recesses 7 and 8 being of such shape as to correspond to the outer and inner faces and the periphery of the shoulder to be formed.

While any suitable means may be employed for moving the upsetting-dies with the desired pressure, and especially with the powerful pressure required for cold upsetting, I prefer to make use of hydraulic pressure, for which purpose I may employ any of the usual forms of apparatus. As shown, I arrange back of each die 4 a cylinder 13, having a piston 9 and rod 10, which latter can be brought to bear against the outer heel of the die 4, and pipes 12 serve to conduct fluid from a pressure-pump D to the cylinders 13 13, the said pipes being provided with suitable cocks.

By means of the two upsetting-dies arranged in line, as described, pressure may be brought simultaneously upon both ends of the bars, whether heated or not, to shape the journals, upset the bar forming enlargements, and impart the proper shape to said enlargements to form the collars, and as the upsetting-dies occupy a relatively fixed position it will be evident that in making a series of axles or blanks all will be formed with the collars the same distance apart, a result which it is practically impossible to secure when the collars are formed successively, as usual.

As the pressure is applied simultaneously to both ends of the bar, it is evident that it is only necessary to apply sufficient power to the clamp in such case to hold the bar in position to be acted upon by the dies; but as it is sometimes necessary to upset a bar only at one end—as, for instance, when sectional axles are formed—I provide means whereby the desired pressure may be secured in such cases. To this end the jaw 2 is operated by a hydraulic press consisting of a cylinder 15, piston 16, and piston-rod 17. The piston-rod 17 may be connected directly with the jaw 2; but to secure greater pressure I prefer to make use of toggles 18 18, the joint of each of which is connected by a link 19 with the piston-rod, the press being supplied with liquid from the pump D through suitable pipes provided with cocks.

While the above-described apparatus may be used in upsetting the metal hot or cold, the pressure which it is practicable to secure is so great that the metal may be upset cold, and the axle bar or blank thus formed is not only superior in quality to that made from a heated bar, but the expense and difficulties incident to heating are avoided.

I do not here claim the method and article of manufacture herein described, as the same constitutes the subject of a separate application for Letters Patent, Serial No. 417,515, of even date herewith.

Without limiting myself to the precise construction and arrangement of parts shown and described, I claim—

1. A machine for making collared axles, consisting of a clamp and two upsetting-dies arranged in line with each other and with the clamp, the parts being recessed to correspond with the faces of the collars, substantially as set forth.

2. The combination, in a machine for making collared axles, of a clamp, two upsetting-dies arranged in line with each other and with the clamp, with recesses corresponding to the faces of the collars, each of said clamps having a socket corresponding to the form of the journal, and means for simultaneously moving the two upsetting-dies to and from the clamp, substantially as set forth.

3. The combination, in a machine for making collared axles, of a clamp, two sliding upsetting-dies, and hydraulic presses for operating said dies, and means for actuating said presses simultaneously, substantially as set forth.

4. The combination, with the clamp of an upsetting-machine, of a hydraulic press, substantially as set forth.

5. The combination, with the movable clamping-jaws, of a hydraulic press and intermediate toggle, substantially as described.

In testimony whereof I have signed my name to this specification in the presence of two subscribing witnesses.

ORLANDO CLIFFORD HALL.

Witnesses:
DORA M. FORREST,
WM. H. DALTON.